United States Patent Office 3,334,077
Patented Aug. 1, 1967

3,334,077
CHLORINATION OF POLYVINYL CHLORIDE
George Gateff, Lakewood, Ohio, assignor to The B. F. Goodrich Company, New York, N.Y., a corporation of New York
No Drawing. Filed June 4, 1964, Ser. No. 372,718
12 Claims. (Cl. 260—92.8)

The present invention relates generally to an improvement in methods for the chlorination of polyvinyl chloride. More specifically, this invention relates to an improvement in the method of chlorinating particulate polyvinyl chloride resin in suspension in an aqueous medium containing an organic swelling agent for the PVC, which improvement comprises conducting the chlorination in the presence of an acrylic acid polymer.

A process for the chlorination of polyvinyl chloride resin is described in U.S. Patent No. 2,996,489, which comprises preparing a suspension of finely divided PVC particles in a major proportion of a liquid aqueous medium, said suspension containing about 5 to 25% by volume of a chlorohydrocarbon which functions as a swelling agent for the PVC resin; saturating the liquid reaction medium with chlorine gas at a temperature no greater than about 65° C.; photo-illuminating said suspension, while maintaining the aforesaid conditions, to induce the chlorination reaction between the dissolved chlorine and the suspended PVC; passing more chlorine gas into said suspension so that there is always present an excess of dissolved chlorine; and terminating the chlorination when the desired amount of chlorine has been reacted with the PVC by extinguishing the photo-illumination. Application for U.S. Patent Serial No. 199,639, and now abandoned, filed June 4, 1962, by George Gateff and Harold H. Bowerman, describes means for increasing the chlorination rate in the practice of the aforedescribed process wherein a catalytic amount of a free-radical-producing agent is added to the suspension of PVC, for example, azo compounds, peroxy compounds, peroxides, nitroso compounds, "redox catalysts" and the like. Application for U.S. Patent Serial No. 184,535 now Patent No. 3,167,535, filed April 2, 1962, by George Gateff and Harold H. Bowerman, also described a method for increasing the reaction rate of the chlorination process disclosed by the aforesaid U.S. Patent No. 2,996,489, which entails adding a catalytic amount of reducing agent to the suspension, for example, reducing sugars, aldehydes, alkali metal sulfides, metabisulfites, bisulfites and hydrosulfites, and compounds having the formula

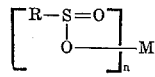

wherein R is a hydrocarbon group having one to 8 carbon atoms, $n$ is an integer of 1 to 2 and M is a metal. Another method for the chlorination of PVC resin in a manner similar to that of U.S. Patent No. 2,996,489, is disclosed in U.S. Patent No. 3,100,762, wherein the difference resides in conducting the chlorination at a temperature of from 60 to 100° C. and at a pressure of 20 to 80 p.s.i.g. in the absence of photo-illumination. The substitution of the heat and pressure for the photo-illumination results in a faster reaction rate, while oddly enough, it is noted that applying heat and pressure together with illumination gives an inferior chlorinated product.

A disadvantage of the foregoing chlorination processes is that the slurry becomes thick and viscous as the chlorination progresses and the swollen resin particles tend to agglomerate and clump together; both of these factors lower the reaction rate and product quality.

After completion of the chlorination process described in the aforesaid specifications, the chlorinated polyvinyl chloride resin is recovered in the following manner. The agitation of the suspension in the reaction vessel is terminated and after a settling period of from about ten minutes to two hours, the suspension will have separated into substantially two phases: the acidic aqueous layer and the solvent swollen resin particles floating on top of the aqueous layer. Unfortunately, about 2 to 5% of the resin does not float to the top and remains suspended in the aqueous medium. The aqueous layer is then drained off and it is during this operation that the "unfloated" resin therein causes plugged lines and other difficulties; ultimately it is discarded and this product loss adds to the expenses of the process. The chlorinated resin is reslurried in water containing a water-soluble base in an amount sufficient to neutralize the residual hydrochloric acid in the solvent-swollen resin particles. Examples of such bases are the sodium, potassium and ammonium hydroxides, carbonates, phosphates and the like. The neutralization step requires less base if prior thereto the resin is given one or more water washes and subsequent separations from the wash water.

The chlorohydrocarbon swelling agent is then stripped from the neutralized resin suspension and recovered as a wet overhead distillate. During the stripping operation, the neutralized slurry has a tendency to foam at the surface. The foaming is very pronounced at temperatures greater than 80° C., which is unfortunate as stripping temperatures of around 100° C. are desirable for good solvent removal. The foaming often causes the distillate condenser and the vent lines leading thereto to be plugged by entrained resin.

The stripped suspension is next filtered, and the resin, containing some residual electrolyte and about 3 to 9% of residual swelling agent, is recovered as the filter cake. The cake is washed with water to remove the residual electrolyte and the wet resin is dried in an air or vacuum oven, usually at 50 to 75° C. The drying operation may be facilitated by previously washing the cake with alcohol to displace the absorbed water with the more volatile liquid. The dried chlorinated PVC is recovered as a powder having essentially the same particle size distribution as the polyvinyl chloride feed.

The chlorinated polyvinyl chloride resin prepared according to the above-described processes and the present invention has outstanding chemical resistance, durability, high softening point and a relatively high heat stability such that the stabilizer-free resin is not degraded when heated in the air for at least 10 minutes at 375 to 400° F. The chlorinated PVC has a density within the range of 1.43 to 1.65 gms./cc. at 25° C., i.e., the chlorine content thereof is 57.4 to 70.9 wt. percent (unchlorinated PVC contains 56.7% chlorine). The preferred resin has a density within the range of about 1.53 to 1.59 gms./cc. (64.3 to 67.7% chlorine) and a heat distortion temperature (ASTM Test Method D–648–56) of from about 95° C. to 125° C., that is, at least 20° C. higher than the heat distortion temperatures of unchlorinated PVC resins. The most preferred post-chlorinated polyvinyl chloride resin has a density in the range of from about 1.55 to 1.58 gms./cc. at 25° C. (65.5 to 67% chlorine) and a heat distortion temperature of at least 100° C. The chlorinated polyvinyl chloride resin is further characterized by being substantially insoluble in acetone, but completely soluble in hot tetrahydrofuran. The resin is useful in the rigid vinyl field for the manufacture of pipe, ductwork, tanks, appliance parts, etc., especially where the products will handle or contact hot water and other hot, corrosive liquids. It has found particular utility in the production of hot water piping for industrial and domestic use. Ordinarily, a small amount of another resin or rubber, e.g., chlorinated polyethylene, styrene-acrylonitrile copolymer or chlorinated polyisobutylene, is blended with the chlorinated PVC resin to improve its shock resistance and mechanical processibility. The pigments, lubricants and stabilizers well known in the vinyl art also can be incorporated therein.

It has now been discovered that the addition of a small amount of acrylic acid polymer to the suspension of PVC resin in the aqueous medium containing the chlorohydrocarbon swelling agent prior to the chlorination steps, such steps being described in the aforementioned disclosures, results in unexpected process improvements and a higher quality product. Briefly stated, the major improvements in and advantages of the present invention are: (a) there is a reduction in the viscosity of the reaction suspension resulting in improved agitation and reaction efficiency and permitting an increase in the amount of PVC charged in a run; (b) the resin particles do not agglomerate during chlorination; (c) after completion of the reaction and agitation is stopped, the swollen chlorinated resin particles sink to the bottom of the reaction vessel instead of floating on top of the aqueous medium; (d) the resin particles do not agglomerate during the stripping of the swelling agent and as a result, there is no foaming and higher stripping temperatures can be used; (e) the chlorinated resin is relatively more heat stable and has better processibility.

According to the present invention, polyvinyl chloride resin is chlorinated as an agitated suspension of particles which are swollen by a chlorohydrocarbon solvent, in a major proportion of aqueous medium saturated with chlorine gas and containing in admixture a minor amount of acrylic acid polymer, e.g., about 0.1 to about 5 parts per 100 parts by weight of PVC. By "aqueous medium" is meant either water, which is preferred, or dilute aqueous solutions of hydrochloric acid. The proportions of PVC resin and water may vary quite widely; for instance, as little as about 130 parts of water per 100 parts by weight of PVC are possible, while no lower limit on solids concentration exists. It is, of course, economically desirable to have the solids concentration as high as possible. Accordingly, use of the acrylic acid polymer permits about a 40% increase in this variable without a corresponding increase in the viscosity of the suspension, said viscosity being an undesirable reaction condition.

The polyvinyl chloride resin starting material is a high molecular weight resin in particulate form which may have been prepared by emulsion or suspension techniques. The particle size thereof can range from about 0.5 micron to about 200 microns; the "macro-granular" type wherein essentially all of the particles are above about 10 microns and contain between about 5 to 50% by volume of pore space are preferred, although the substantially non-porous resins (i.e., having less than 5% of pore space) are suitable for use in the present chlorination process and give good results. The molecular weight of the PVC resin may be related to its specific viscosity which is determined herein by dissolving 0.24 gram of the resin in 50 ml. of nitrobenzene while mildly heating and agitating on a solution roller. The solutions are then filtered into an appropriate Ubbelohde viscometer, previously calibrated for the pure solvent. The flow times in seconds for the solutions are determined at four different dilutions to obtain flow data at a number of concentrations. A portion of the original filtered solution is dried to constant weight at 130° C. to obtain a true concentration value. The ratio of the flow time of the solution to the flow time of the pure solvent is a value known as the "reduced viscosity." When the number (1) is subtracted from "reduced viscosity," one obtains the value known as the "specific viscosity." The PVC starting material in the process of this invention has a high molecular weight such that it possesses a specific viscosity of at least 0.20. Although the preferred polyvinyl chloride resin for the chlorination is the homopolymer of vinyl chloride, the process is adapted to the chlorination of copolymers of vinyl chloride with other monoolefinic monomers such as vinyl acetate, vinylidene chloride, acrylic and methacrylic acid esters, maleic acid esters, fumaric acid esters, ethylene, propylene and others, in which the polymerized vinyl chloride component of the copolymer is at least 70% by weight.

The point at which the acrylic acid polymer is added to the aqueous medium in preparing the suspension for chlorination is critical. The acrylic acid polymer must be added after both the PVC resin and water have been charged into the reactor and preferably while the suspension is being agitated. If the acrylic acid polymer is added to the aqueous medium before the PVC resin, the chlorinated resin product and the aqueous medium will not subsequently separate into two distinct layers to permit their ready separation by decanting.

A chlorohydrocarbon, desirably a hydro-chloromethylene compound, is added to the PVC resin suspension to swell the particles and encourage more intimate contact of the chlorine with the polymer. By "hydro-chloromethylene" compound is meant a chlorinated hydrocarbon containing at least one chlorine atom, at least one hydrogen atom and only one carbon atom. Such materials include monochloromethane, dichloromethane and trichloromethane (chloroform) the latter being the most efficient swelling agent. The amount of swelling agent used is from about 15 to about 100 parts by weight per 100 parts by weight of PVC; however, from about 25 to 40 parts per hundred give best results. The hydro-chloromethylenes are preferred over other chlorinated hydrocarbons because they react but slowly with chlorine and the final product of such reaction is carbon tetrachloride, an innocuous material easily removed from the final polymer, and, in addition, the chlorinated PVC product has greater heat stability. Chlorinated ethylene and ethane derivatives and other chlorinated higher alkyl hydrocarbons are readily converted to high-boiling poly-chloro derivatives very difficult to remove from the polymer.

In general, it is advantageous to introduce the gaseous chlorine into a substantially oxygen-free suspension. This may be accomplished by merely purging the reactor with an inert gas such as nitrogen or hydrogen chloride, or applying a vacuum thereto and then "breaking" the vacuum with an inert gas.

The aqueous medium is saturated with chlorine gas before reaction is initiated and the excess of chlorine is maintained throughout the reaction period. Thorough agitation of the suspension is maintained during the reaction cycle. As previously mentioned, the reaction rate can be increased by adding catalytic amounts of a free-radical-producing substance or a reducing agent to the suspension.

In one illustrative embodiment of the process, the chlorination of the PVC is initiated by exposing the suspension to photo-illumination. Any form of actinic radiation is suitable; for example, ordinary incandescent lamps, mercury vapor or arc lamps, neon glow tubes, fluorescent tubes, carbon arcs and sodium vapor lamps may be employed. Ultra-violet light is the preferred source of illumination. In order to obtain a highly heat-stable chlorinated resin when the chlorination is stimulated by photo-illumination, the reaction temperature should be maintained below about 65° C. Temperatures as low as 0° C. can be employed, although temperatures of from about 30° C. to about 55° C. are preferred. The pressure in the reactor should not exceed about 10 p.s.i.g. when practicing this embodiment.

In another illustrative embodiment of the process, the chlorination of the PVC resin is carried out at higher temperatures, 60 to 100° C., and under pressures within the range of 20 to 80 p.s.i.g., and further in the substantial absence of photo-illumination.

In the absence of acrylic acid polymer, it is observed that as the chlorination of the PVC resin progresses, there is a gradual increase in suspension viscosity. This thickening prevents efficient agitation which in turn has a detrimental effect on the reaction between the chlorine and resin. The viscosity effect becomes a greater handicap at high solids concentration. When the acrylic acid polymer is used, the increase in viscosity of the suspension is negligible and a higher solids concentration in the suspension is therefore permitted. For instance, there can be used as little as about 130 parts of aqueous medium per 100 parts of resin in the presence of acrylic acid polymer compared to a minimum of about 260 parts of aqueous medium per 100 parts of resin in the absence of acrylic acid polymer. Moreover, when acrylic acid polymer is used, there is no resin particle agglomeration and clumping together, which condition occurs when the polymeric additive is absent. As stated above, agglomeration is a hindrance to efficient reaction and leads to an inferior product.

The reaction is continued until the desired degree of chlorination is attained. Representative reaction periods are about 5.5 hours to produce a chlorinated polyvinyl chloride resin product containing 66.1% of chlorine (equivalent to a resin density of 1.56 gms./cc. at 25° C.); about 4 hours for a chlorine content of 64.5% (density of 1.535 gms./cc.); and about 7 hours for a chlorine content of 67.7% (density of 1.590 gms./cc.). The reaction is terminated by removing the source of photo-illumination when light has been used as a chlorination stimulator; or if heat and pressure have been used in lieu of light, cooling the suspension and reducing the pressure terminates reaction; and thereafter, in either case, immediately shutting off the chlorine gas feed.

After the reaction has been terminated and the reaction vessel has been vented to allow passage of most of the chlorine gas therefrom, the product recovery phase of the operation is started. The product recovery is normally carried out at ambient temperatures, that is, from about 60 to 120° F., except where indicated hereinbelow. Agitation is stopped and the suspension, after a settling period ranging from about ten minutes to two hours, separates with the chloromethane-swollen resin sinking to the bottom of the acidic aqueous medium. The aqueous medium, which is substantially free of floating resin particles (generally less than 0.5% of the total resin is suspended), is decanted and discarded, most conveniently by siphoning. This separation is accomplished in less than half the time required when acrylic acid polymer has not been used in the chlorination. The resin particles in the vessel may be reslurried one or more times in fresh water, which is separated as previously by decantation, in order to remove some of the HCl acid solution trapped therein; however, this intermediate washing step is not necessary.

Neutralization of the residual hydrochloric acid entrapped in the swollen resin particles is accomplished by treating the polymer with water containing a soluble basic material, for example, sodium, potassium or ammonium hydroxides, carbonates, bicarbonates, phosphates and others. The suspension is, of course, agitated during the neutralization. The amount of treatment water may range from about 75 to 500 parts by weight per 100 parts by weight of resin and it will contain in solution a sufficient amount of base to effectively neutralize residual HCl and provide an essentially neutral pH (6.0 to 8.0). In general, between about 2 and 5 parts of base per 100 parts of resin are required, but this amount is approximately 30 to 60% less than when the chlorination has been carried out in the absence of acrylic acid polymer. This savings is due to a more efficient prior separation of the aqueous reaction medium from the chlorinated polymer and also less entrapped HCl solution in the resin which has been drained of said aqueous medium.

The hydro-chloromethylene compound, which is still present as a swelling agent for the resin, is next recovered by evaporation from the agitated, neutralized suspension. Having used the acrylic acid polymer during chlorination is advantageous during this solvent stripping as the resin particles do not agglomerate and there is no foaming, permitting a more efficient stripping and higher distillation temperatures and therefor providing a better solvent recovery without an attendant detrimental effect on the resin's quality. For instance, without acrylic acid polymer, suspension temperatures during stripping generally are from 75 to 90° C., and solvent recoveries average about 50%. The present invention permits stripping temperatures as high as about 100° C. and solvent recovery is increased to about 75–80%. The stripping operation takes from about 1 to 4 hours. The overhead distillate is composed of water and the hydro-chloromethylene which is saved for recycling.

The neutralized aqueous suspension of resin is cooled, and upon standing, separates into the inverse phases whereby the substantially solvent-free resin sinks to the bottom. The bulk of the aqueous medium is decanted and the thick resin slurry is filtered. The filter cake is washed with fresh water to remove residual salts and electrolyte, about 100 to 300 parts of wash water per 100 parts of resin being adequate. If desired, residual water in the cake may be displaced by an alcohol wash before the resin is dried, as described earlier in this specification.

The "acrylic acid polymers" embodied herein are in general the essentially linear polymers of acrylic or methacrylic acid, the crosslinked interpolymers of said acids with a polyunsaturated compound having at least two alkenyl groups, the essentially linear interpolymers of acid acids with acrylate and methacrylate esters or interpolymers of mixtures thereof. Said acrylate esters are represented by the structure:

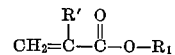

wherein R' is hydrogen or methyl and $R_1$ is an alkyl group having from 1 to 8 carbon atoms, such as methyl methacrylate, methyl acrylate, ethyl acrylate and methacrylate, the butyl acrylates and methacrylates and the octyl acrylates and methacrylates, especially the 2-ethyl hexyl acrylate and methacrylate. In the interpolymers of acrylic or/and methacrylic acid with the acrylate and methacrylate esters the amount of the polymerized acid component should be at least 80 mol percent of the copolymer. The foregoing "acrylic acid polymers" and their methods of preparation are well known in the polymer art. The essentially linear acrylic acid polymers useful in this invention have average molecular weights in the range of between about 5,000 and about 500,000.

Other representative "acrylic acid polymers" are the lightly crosslinked interpolymers of acrylic or methacrylic acid or mixtures of such acids with a polyunsaturated compound having a plurality of terminally unsaturated polymerizable groups and copolymerizable with said acids, for example, copolymers of said acrylic acids with a minor amount, e.g., about 0.5 to about 2.5% by weight, preferably 0.75 to 2.0% by weight of the polyunsaturated crosslinking monomer, based on the total weight of the copolymer. These crosslinked interpolymers can also contain up to about 20 mol percent of copolymerized acrylate and methacrylate esters as aforedescribed. The copolymerization of the monomers ordinarily is carried out in an inert hydrocarbon diluent using a free-radical catalyst. The acrylic acid crosslinked copolymers are recovered from their polymerization medium as white powders. They are high molecular weight resins, e.g., generally having an average molecular weight greater than about 200,000, preferably greater than about 2,000,000 and usually in the range of about 3,000,000.

Typical polyunsaturated compounds which may be copolymerized with acrylic or methacrylic acid in minor amounts to provide the lightly crosslinked acrylic acid polymers are the vinyl, allyl and methallyl ethers of polyhydric alcohols having at least four carbon atoms and at least three alcoholic hydroxyl groups. The preferred polyalkenyl polyether monomers are polyallyl sucrose and polyallyl pentaerythritol, desirably containing an average of at least 3 allyl groups for each molecule of sucrose or pentaerythritol, the allyl groups attached thereto by means of ether linkages. The preferred polyallyl sucrose contains an average of 5 to 6 allyl groups per molecule of sucrose (theoretical maximum is 8 allyl groups) and the preferred polyallyl pentaerythritol contains 4 allyl ether groups per molecule (the theoretical maximum). Acrylic acid copolymers employing crosslinking monomers of the aforesaid type are described in U.S. Patent No. 2,798,053. Other polyunsaturated compounds that can be employed to prepare the copolymers are the polymeric, benzene soluble products resulting from Na or K catalyzed polymerization of diolefines, preferably conjugated dienes. These polymers have a very large proportion of 1,2 structure in the chain and consequently have plurality of $CH_2=$ side groups which can be copolymerized with the acrylic acids. Acrylic acid interpolymers of this type are described in U.S. Patent 2,858,281. Other crosslinking agents that can be copolymerized with acrylic or methacrylic acid are the polyallyl or polymethallyl trimethylene trisulfones. These monomers are described in U.S. Patents 2,535,533 and 2,535,534 and the acrylic acid copolymers are described in U.S. Patent 2,958,679. Still other crosslinking agents for the acrylic acid polymers are the polyvinyl, polyallyl or polymethallyl silanes of the corresponding tin compounds. In these compounds the silicon or tin atom is connected to a carbon atom by a covalent bond. The silicon or tin compound, of course, must have at least two of the unsaturated groups mentioned above. The preferred monomers of this class are tetrallyl or tetravinyl silane or tin. However, satisfactory copolymers can be produced with tin compounds having two or three of the groups, vinyl, allyl or methallyl. The remainder of the silicon or tin atom can have any nontoxic group and particularly an allyl group. The acrylic acid copolymers made with the polyallyl or polyvinylsilane or tin compounds are described in U.S. Patent 2,985,631. Still another operable acrylic acid polymer is the copolymer of acrylic or methacrylic acid with small amounts of a polyallyl phosphate ester as the crosslinking agent, said copolymer being described in the copending U.S. patent application of Frank A. Wagner, Ser. No. 425,338, filed Jan. 13, 1965. The allyl phosphates embodied therein conform to the formula

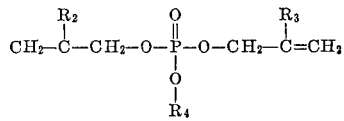

where $R_2$ and $R_3$ are independently selected from the group consisting of a hydrogen atom and a methyl radical, and $R_4$ is selected from the group consisting of a hydrogen atom, an allyl radical, a methallyl radical, an alkyl radical, an aralkyl radical, an aryl radical and an alkenyl radical. From this class of monomers triallyl phosphate is preferred.

The acrylic acid polymer employed as the modifier in the chlorination of PVC according to this invention may, if desired, be added to the aqueous suspension of PVC resin as the readily soluble sodium, potassium or other monovalent metal salt thereof prior to the chlorination. The salts are easily converted to the polymeric acid form by addition of the appropriate amount of a mineral acid or they can undergo conversion when the aqueous medium is being saturated with chlorine gas and hydrochloric acid is necessarily being formed in the water. The ammonia and amine salts of the acrylic acid polymer cannot be used because they will poison the reaction and inhibit chlorination.

As little as about 0.1 part, per 100 parts by weight of polyvinyl choride resin, of acrylic acid polymer added to the suspension will give improved results. Although as much as about 5 parts per hundred may be used, no useful purpose is served by exceeding 1 to 2 parts per hundred. The preferred amount is from about 0.5 to 1 phr.

The mechanism by which the acrylic acid polymer provides the process improvements herein disclosed is not known, except to say that it seems to provide unique dispersing or wetting agent effects in the vinyl resin particle suspension. However, tests showed that the commonly used surface active agents do not give the improvements in the present process that result with the acrylic acid polymer. For example, the anionic surfactants such as the fatty acid soaps (e.g., sodium and potassium salts of fatty acids, rosin acids, and of disproportionated or dehydrogenated rosin acids), the alkyl sulfonates and sulfates, the alkylaryl sulfonates and sulfates and the like, and the nonionic surfactants such as the polyglycol fatty acid esters, the polyoxylpropylene and polyoxyethylene fatty alcohol ethers and the like are not only ineffectual as processing aids but also reduce the product's heat stability. Cationic surfactants, which are in general amine or ammonium salts, inhibit the chlorination. Polyvinyl alcohol, a typical suspending agent, causes product discoloration and poor heat stability. Polyvinyl alcohol also reacts with chlorine to form undesirable by-products. Gelatin, another common suspending agent, almost completely inhibits the chlorination.

The examples that follow are set forth to clarify the invention and should not be regarded as limiting the scope thereof in any way. Amounts of reactants and other materials are given in parts by weight.

EXAMPLE I

Two chlorinations were performed using the following recipes.

|  | Run 1 (control) | Run 2 |
|---|---|---|
| Water | 260 | 215 |
| Polyvinyl chloride resin [1] | 100 | 100 |
| Chloroform (swelling agent) | 27 | 27 |
| Polyacrylic acid [2] | 0 | 0.5 |

[1] "Geon 110 x 154" (product of B. F. Goodrich Chemical Co.): a highly porous (about 30% pore space by volume) macro-granular vinyl chloride polymer with a specific viscosity of 0.54 having a particle size distribution such that 100% is retained on a 200 mesh screen and the preponderance of particles are greater than 25 microns.
[2] Essentially linear acrylic acid polymer in dry powder form with a molecular weight of approximately 250,000.

The operating procedure was as follows. The agitated, substantially oxygen-free suspension was saturated with chlorine gas and the reaction initiated by actinic activation using an ultraviolet light source. The gaseous chlorine feed rate was maintained during the reaction to insure saturation and an excess of chlorine. The reactor pressure was 4 to 5 p.s.i.g. and temperature 48 to 52° C. As the reactions progressed, the suspension in Run 1 became quite viscous, while that of Run 2 remained very fluid. There was considerable particle agglomeration in the suspension in Run 1 and insignificant agglomeration in Run 2. Reaction periods were 10 and 7 hours respectively. The chlorinations were terminated by extinguishing the light, shutting off the chlorine feed and venting the unreacted chlorine from the vessel. The stirring was stopped and the suspensions separated into two layers: in Run 1, the chlorinated polyvinyl chloride floated on top of the aqueous medium and in Run 2, the resin sunk to the bottom. The aqueous media were separated therefrom, by draining and by decantation (syphoning), respectively. The resin lost with the aqueous drainings were approximately 4% and 0.5%, respectively, of the total chlorinated resin. The swollen resin was neutralized by a reslurrying in 200 parts of water containing sufficient base to neutralize the free acid therein; 6.5 and 2.5 parts of $Na_2CO_3$ were required in Runs 1 and 2, respectively. The chloroform was distilled from the slurries at temperatures of 90 and 100° C., respectively, to yield recoveries of 50 and 75% of the chloroform charged. During the chloroform stripping the suspension of Run 1 foamed excessively while that of Run 2 did not foam at all. The better solvent recovery in Run 2 was apparently due to lack of particle agglomeration and foaming. The resin was recovered as filter cakes from the neutralized suspensions and dried at 60–70° C. in an air oven. The chlorinated PVC from both runs had a density of 1.57 gms./cc. (chlorine content of 66.6%). Samples were prepared therefrom for physical testing in the following manner. The powdery chlorinated PVC (100 parts) was compounded with 0.75 part of lubricant (calcium stearate) and 3 parts of stabilizer (barium-cadmium mixed fatty acid salts) and the mixture was roll-milled into sheets for determining heat distortion temperature, tensile strength and heat stability. Samples for extrudability testing were made from compounds containing 100 parts of resin, 2 parts of calcium stearate, 3 parts stabilizer (calcium-zinc mixed fatty acid salts) 5 parts of pigment ($TiO_2$), and 7 parts of chlorinated polyethylene (for improving processibility and impact strength), which compounds were milled into sheets which in turn were cut into cubes and processed in an NRM extruder into pipe having an outside diameter of 0.75 inch and a wall thickness of 0.06 inch. The results are set forth below.

|  | Run 1 (control) | Run 2 |
|---|---|---|
| Ultimate tensile strength, p.s.i. (ASTM Method D-412-51T) | 7,400 | 7,400 |
| Heat distortion temperature, ° C. (ASTM D-648-56) | 105 | 106 |
| Heat stability at 400° F., minutes to turn black in air | 40 | 55 |
| Extrusion rate, inches/minute | 62 | 68 |

The chlorination and recovery techniques and observations in Runs 3 and 4 were substantially the same as in Example I. The operating data are summarized below.

|  | Run 3 (control) | Run 4 |
|---|---|---|
| Reaction time, hours | 6 | 4 |
| $Na_2CO_3$ required for neutralization, parts | 5 | 2.4 |
| Chloroform recovery, percent | 55 | 75 |

The chlorinated resin in both cases contained 66.6% chlorine (density: 1.57 gms./cc.). Physical properties of the resin were determined on compounds containing 100 parts thereof, 2 parts calcium stearate, 3 parts of stabilizer, 5 parts $TiO_2$ and 7 parts of chlorinated polyethylene.

|  | Run 3 (control) | Run 4 |
|---|---|---|
| Tensile strength, p.s.i. | 7,790 | 7,940 |
| Heat distortion temperature, ° C. | 100 | 103 |
| Heat stability at 400° F., minutes | 30 | 40 |

EXAMPLE III

The procedures of Example I were repeated using as the starting PVC material "Geon 110 x 154." In each run except the control (Run 5), 0.5 part, per 100 parts of PVC, of acrylic acid polymer specified below was added to the suspension. The beneficial effects of the acrylic acid polymer addition as hereinbefore described were observed for Runs 6–11. The other data are summarized in the following table.

|  | Run 5 (control) | Run 6 | Run 7 | Run 8 | Run 9 | Run 10 | Run 11 |
|---|---|---|---|---|---|---|---|
| Acrylic Acid Polymer | 0 | "Carbopol 934" [1] | "Carbopol 941" [2] | "K702" [3] | "K708" [4] | "K714" [5] | "K718" [6] |
| Physical Properties of chlorinated PVC: |  |  |  |  |  |  |  |
| Density, gms./cc. | 1.57 | 1.565 | 1.58 | 1.563 | 1.57 | 1.568 | 1.57 |
| Heat distortion [7] temperature, ° C. | 112 | 104.5 | 113 | 109 | 113.5 | 107 | 109 |
| Heat stability [7] at 400° F., minutes to turn black in air | 40 | Not measured | 55 | 50 | 55 | 50 | 60 |

[1] "Carbopol 934"=A copolymer of acrylic acid and 1% by weight of a polyallyl ether of sucrose having an average of about 5.8 allyl groups for each sucrose molecule.
[2] "Carbopol 941"=A copolymer of acrylic acid and 0.5% by weight of the polyallyl ether of pentaerythritol. The "Carbopol" crosslinked acrylic acid polymers are sold by the B. F. Goodrich Chemical Company, Cleveland, Ohio.
[3] "K702"=Essentially linear polyacrylic acid having a molecular weight of about 90,000, sold by the B. F. Goodrich Chemical Company as a water solution containing 25% polymer.
[4] "K708"=The sodium salt of "K702."
[5] "K714"=Essentially linear polyacrylic acid having a molecular weight of about 250,000, sold as a 15% water solution by the B. F. Goodrich Chemical Company.
[6] "K718"=The sodium salt of "K714."
[7] Properties determined on milled compound containing 100 parts chlorinated PVC, 3 parts Ba-Cd stabilizer and 0.5 part calcium stearate.

It is apparent from the foregoing observations and data that the presence of acrylic acid polymer in the PVC suspension during chlorination and product recovery not only yields significant process improvements but also results in a higher quality product.

EXAMPLE II

The procedures set forth in Example I were repeated using the following recipes:

|  | Run 3 (control) | Run 4 |
|---|---|---|
| Water | 300 | 240 |
| Polyvinyl chloride resin [1] | 100 | 100 |
| Chloroform | 30 | 30 |
| Polyacrylic acid [2] | 0 | 0.6 |

[1] "Geon 100 x 13": a medium porosity (10–20% pore space) macro-granular resin with a specific viscosity of 0.32.
[2] Essentially linear polymer with a molecular weight of about 250,000.

It is to be understood that the foregoing examples are illustrative only and not limiting since there are many variations and modifications possible in carrying out the process of the invention as defined in the appended claims. Again, the essence of the invention resides in carrying out the aqueous suspension chlorination of hydro-chloromethylene-swollen PVC in the presence of an essentially linear or lightly crosslinked polymer of an alpha, beta-monoolefinically terminally unsaturated monocarboxylic acid having from 3 to 4 carbon atoms, which polymer may also contain up to about 20 mol percent of copolymerized alkyl ester of said monocarboxylic acid.

I claim:
1. In the method for chlorinating particulate polyvinyl chloride resin composed of particles within the range of from about 0.5 micron to about 200 microns comprising the steps of preparing a suspension of 100 parts by weight of the polyvinyl chloride in at least about 130 parts by weight of liquid aqueous medium, said suspension containing from about 15 to about 100 parts by weight of hydro-chloromethylene compound to serve as a swelling agent for the suspended polyvinyl chloride resin, sub- stantially saturating the liquid aqueous medium of the suspension with gaseous chlorine, inducing the chlorination reaction between the chlorine and the polyvinyl chloride in said suspension, maintaining an excess of dissolved chlorine in said suspension over that momentarily reacting with the suspended resin, terminating the reaction when the desired amount of chlorination of the resin has been achieved, separating the hydro-chloromethylene-swollen chlorinated polyvinyl chloride resin product from the aqueous medium, neutralizing said product, and separating the hydro-chloromethylene from said product; the improvement which comprises admixing with said suspension of polyvinyl chloride resin in liquid aqueous medium prior to the chlorination thereof from about 0.1 part to about 5 parts of an acrylic acid polymer selected from the group consisting of the essentially linear polymer of an alpha, beta-monoolefinically terminaly unsaturated monocarboxylic acid having from 3 to 4 carbon atoms and having an average molecular weight between about 5,000 and about 500,000, the crosslinked interpolymer of said monocarboxylic acid and from about 0.5 to about 2.5% by weight of a polyunsaturated compound having at least two alkenyl groups and copolymerizable with said acid having an average molecular weight greater than about 200,000, and the aforesaid polymers and interpolymers containing up to 20 mol percent of copolymerized alkyl ester of said monocarboxylic acid wherein the alkyl group of said ester has 1 to 8 carbon atoms.

2. In the method for chlorinating particulate polyvinyl chloride resin composed of particles within the range of from about 0.5 micron to about 200 microns comprising the steps of preparing a suspension of 100 parts by weight of the polyvinyl chloride in at least about 130 parts by weight of liquid aqueous medium, said suspension containing from about 15 to about 100 parts by weight of a hydro-chloromethylene compound to serve as a swelling agent for the suspended polyvinyl chloride resin, substantially saturating the liquid aqueous medium of the suspension with gaseous chlorine, inducing the chlorination reaction between the chlorine and the polyvinyl chloride in said suspension by photo-illumination, maintaining the reaction at a temperature no greater than about 65° C. and maintaining an excess of dissolved chlorine in said suspension over that momentarily reacting with the suspended resin, terminating the reaction when the desired amount of chlorination of the resin has been achieved by extinguishing the photo-illumination, separating the hydro-chloromethylene-swollen chlorinated polyvinyl chloride resin product from the aqueous medium, neutralizing said product, and separating the hydro-chloromethylene from said product; the improvement which comprises admixing with said suspension of polyvinyl chloride resin in liquid aqueous medium prior to the chlorination thereof from about 0.1 part to about 5 parts of an acrylic acid polymer selected from the group consisting of the essentially linear polymer of an alpha, beta-monoolefinically terminally unsaturated monocarboxylic acid having from 3 to 4 carbon atoms and having an average molecular weight between about 5,000 and about 500,000, the crosslinked interpolymer of said monocarboxylic acid and from about 0.5 to about 2.5% by weight of a polyunsaturated compound having at least two alkenyl groups and copolymerizable with said acid having an average molecular weight greater than about 200,000, and the aforesaid polymers and interpolymers containing up to 20 mol percent of copolymerized alkyl ester of said monocarboxylic acid wherein the alkyl group of said ester has 1 to 8 carbon atoms.

3. In the method for chlorinating particulate polyvinyl chloride resin composed of particles within the range of from about 0.5 micron to about 200 microns comprising the steps of preparing a suspension of 100 parts by weight of the polyvinyl chloride in at least about 130 parts by weight of liquid aqueous medium, said suspension containing from about 25 to about 40 parts by weight of chloroform to serve as a swelling agent for the suspended polyvinyl chloride resin, substantially saturating the liquid aqueous medium of the suspension with gaseous chlorine, inducing the chlorination reaction between the chlorine and the polyvinyl chloride in said suspension by photo-illumination, maintaining the reaction at from about 30° C. to 55° C. and maintaining an excess of dissolved chlorine in said suspension over that momentarily reacting with the suspended resin, terminating the reaction when the desired amount of chlorination of the resin has been achieved by extinguishing the photo-illumination, separating the chloroform-swollen chlorinated polyvinyl chloride resin product from the aqueous medium, neutralizing said product, and separating the chloroform from said product; the improvement which comprises admixing with said suspension of polyvinyl chloride resin in liquid aqueous medium prior to the chlorination thereof from about 0.1 part to about 5 parts of an arcylic acid polymer selected from the group consisting of the essentially linear polymer of an alpha, beta-monoolefinically terminally unsaturated monocarboxylic acid having from 3 to 4 carbon atoms and having an average molecular weight between about 5,000 and about 500,000, the crosslinked interpolymer of said monocarboxylic acid and from about 0.5 to about 2.5% by weight of a polyunsaturated compound having at least two alkenyl groups and copolymerizable with said acid having an average molecular weight greater than about 200,000, and the aforesaid polymers and interpolymers containing up to 20 mol percent of copolymerized alkyl ester of said monocarboxylic acid wherein the alkyl group of said ester has 1 to 8 carbon atoms.

4. The method according to claim 3 wherein there is from 0.5 part to about 2 parts of acrylic acid polymer in the suspension.

5. The method of claim 4 wherein the acrylic acid polymer is polyacrylic acid having an average molecular weight between about 5,000 and about 500,000.

6. The method of claim 4 wherein the acrylic acid polymer is a crosslinked interpolymer of acrylic acid and polyallyl ether of sucrose having an average molecular weight greater than about 200,000.

7. The method of claim 4 wherein the acrylic acid polymer is a crosslinked interpolymer of acrylic acid and polyallyl ether of pentaerythritol having an average molecular weight greater than about 200,000.

8. In the method for chlorinating particulate polyvinyl chloride resin composed of particles within the range of from about 0.5 micron to about 200 microns comprising the steps of preparing a suspension of 100 parts by weight of the polyvinyl chloride in at least about 130 parts by weight of liquid aqueous medium, said suspension containing from about 15 to about 100 parts by weight of a hydro-chloromethylene compound to serve as a swelling agent for the suspended polyvinyl chloride resin, substantially saturating the liquid aqueous medium of suspension with gaseous chlorine and inducing the chlorination reaction between the chlorine and the polyvinyl chloride in said suspension by maintaining the reaction temperature at from 60° C. to 100° C. and the pressure at from 20 to 80 p.s.i.g., terminating the reaction when the desired amount of chlorination of the resin has been achieved, separating the hydro-chloromethylene-swollen chlorinated polyvinyl chloride resin product from the aqueous medium, neutralizing said product, and separating the hydro-chloromethylene from said product; the improvement which comprises admixing with said suspension of polyvinyl chloride resin in liquid aqueous medium prior to the chlorination thereof from about 0.1 part to about 5 parts of an acrylic acid polymer selected from the group consisting of the essentially linear polymer of an alpha, beta-monoolefinically terminally unsaturated monocarboxylic acid having from 3 to 4 carbon atoms and having an average molecular weight between about 5,000 and about 500,000, the crosslinked interpolymers of said monocarboxylic acid and from about 0.5 to about 2.5% by weight of a polyunsaturated compound having at least two alkenyl groups and copolymerizale with said acid having an average molecular weight greater than about 200,000, and the aforesaid polymers and interpolymers containing up to 20 mol percent of copolymerized alkyl ester of said monocarboxylic acid wherein the alkyl group of said ester has 1 to 8 carbon atoms.

9. The method according to claim 8 wherein the hydrochloromethylene compound is chloroform and there is from 0.5 part to about 2 parts of acrylic acid polymer in the suspension.

10. The method of claim 9 wherein the acrylic acid polymer is polyacrylic acid having an average molecular weight between about 5,000 and about 500,000.

11. The method of claim 9 wherein the acrylic acid polymer is a crosslinked interpolymer of acrylic acid and polyallyl ether of sucrose having an average molecular weight greater than about 200,000.

12. The method of claim 9 wherein the acrylic acid polymer is a crosslinked interpolymer of acrylic acid and polyallyl ether of pentaerythritol having an average molecular weight greater than about 200,000.

No references cited.

JOSEPH L. SCHOFER, *Primary Examiner.*

J. A. DONAHUE, *Assistant Examiner.*